United States Patent
Boss et al.

(10) Patent No.: US 7,444,156 B2
(45) Date of Patent: Oct. 28, 2008

(54) USER-TAGGING OF CELLULAR TELEPHONE LOCATIONS

(75) Inventors: Jerome Boss, Bellevue, WA (US); Lili Cheng, Bellevue, WA (US); Cezary Marcjan, Redmond, WA (US); David Milstein, Redmond, WA (US); Gilad Odinak, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 538 days.

(21) Appl. No.: 09/789,434

(22) Filed: Feb. 20, 2001

(65) Prior Publication Data

US 2002/0115446 A1  Aug. 22, 2002

(51) Int. Cl.
*H04Q 7/00* (2006.01)
(52) U.S. Cl. ................. 455/456.3; 455/404.2
(58) Field of Classification Search ......... 709/200, 709/217, 224; 455/456.2, 456.3, 456.1, 456.6, 455/456.5, 456, 456.4, 404.2, 457, 435.1, 455/435.2; 712/1; 700/90; 701/200, 201, 701/202, 203, 204, 205, 208, 213; 340/573.1; 456/456.1, 456.2, 456.3, 456.4, 456.5, 404.2, 456/457, 435.1, 435.2
See application file for complete search history.

(56) References Cited

U.S. PATENT DOCUMENTS

| | | | | |
|---|---|---|---|---|
| 5,131,020 A | * | 7/1992 | Liebesny et al. | 455/414.3 |
| 5,155,689 A | * | 10/1992 | Wortham | 455/456.3 |
| 5,208,756 A | * | 5/1993 | Song | 455/456.3 |
| 5,317,323 A | * | 5/1994 | Kennedy et al. | 342/457 |
| 5,519,760 A | * | 5/1996 | Borkowski et al. | 455/404.2 |
| 5,548,816 A | * | 8/1996 | DeVaney | 455/456.2 |
| 5,561,704 A | * | 10/1996 | Salimando | 455/456.5 |
| 5,926,133 A | * | 7/1999 | Green, Jr. | 432/363 |
| 5,941,930 A | * | 8/1999 | Morimoto et al. | 701/201 |
| 5,950,125 A | * | 9/1999 | Buhrmann et al. | 455/432.1 |
| 6,075,993 A | * | 6/2000 | Kawamoto | 455/45.3 |
| 6,360,101 B1 | * | 3/2002 | Irvin | 455/456.6 |
| 6,377,793 B1 | * | 4/2002 | Jenkins | 455/412.1 |
| 6,385,458 B1 | * | 5/2002 | Papadimitriou et al. | 455/456.2 |
| 6,477,363 B1 | * | 11/2002 | Ayoub et al. | 455/404.2 |

(Continued)

FOREIGN PATENT DOCUMENTS

EP  0785535 A  7/1997

(Continued)

OTHER PUBLICATIONS

Mass, Henning, "Location-Aware Mobile Applications Based On Directory Services", Mobile Networks and Applications 3, 1998, p. 157-173.

(Continued)

*Primary Examiner*—Eric Coleman

(57) ABSTRACT

A user-controlled cellular telephone positioning feature allows a cellular telephone user to correlate a user-specified location name with a cellular telephone location among one or more cells of a cellular telephone network. In one implementation, a cellular telephone location tagging application is stored and operated on a cellular telephone. The application obtains a cell identification string corresponding to a cell of a cellular telephone system with which cell the cellular telephone is in communication and allows the user to associate a location name and the cell identification string as location information for a selected location. Location data are maintained on a user's cellular telephone, and the user can selectively make the location information available others.

24 Claims, 6 Drawing Sheets

U.S. PATENT DOCUMENTS

| | | | |
|---|---|---|---|
| 6,487,495 B1 * | 11/2002 | Gale et al. | 701/209 |
| 6,603,405 B2 * | 8/2003 | Smith | 340/905 |
| 6,636,742 B1 * | 10/2003 | Torkki et al. | 455/456.1 |
| 6,668,173 B2 * | 12/2003 | Greene | 455/445 |
| 6,680,675 B1 * | 1/2004 | Suzuki | 340/988 |
| 6,699,757 B1 * | 3/2004 | Hwang | 438/262 |
| 6,716,101 B1 * | 4/2004 | Meadows et al. | 455/456.1 |
| 6,756,913 B1 * | 6/2004 | Ayed | 340/825.49 |
| 6,757,544 B2 * | 6/2004 | Rangarajan et al. | 455/456.1 |
| 6,771,971 B2 * | 8/2004 | Smith | 455/456.1 |
| 6,958,692 B1 * | 10/2005 | Ratschunas | 340/539.13 |
| 6,993,564 B2 * | 1/2006 | Whitten, II | 709/207 |
| 7,058,036 B1 * | 6/2006 | Yu et al. | 370/335 |
| 7,072,665 B1 * | 7/2006 | Blumberg et al. | 455/456.1 |
| 7,130,630 B1 * | 10/2006 | Enzmann et al. | 455/435.1 |

FOREIGN PATENT DOCUMENTS

| | | |
|---|---|---|
| EP | 0829704 A | 3/1998 |
| JP | 09311177 A | 2/1997 |
| WO | WO 9714054 A | 4/1997 |
| WO | WO 99/5611 | 11/1999 |
| WO | WO 99/56144 | 11/1999 |

OTHER PUBLICATIONS

European Patent Office, "International Search Report," Dated Sep. 13, 1999, by Authorized Officer Kahn, K-D.

Authorized Officer; Kahn, K-D; "International Search Report", Sep. 13, 1999; 3 pages.

* cited by examiner

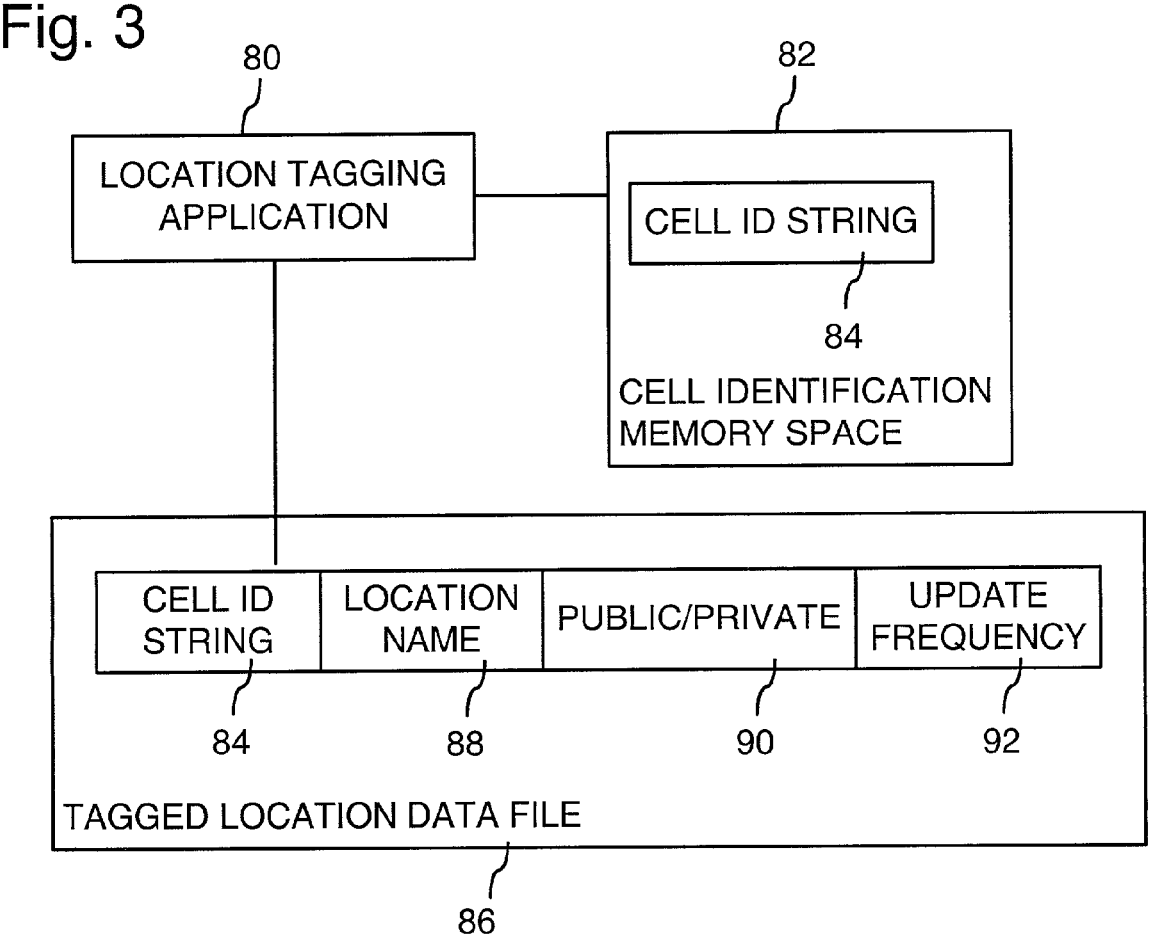
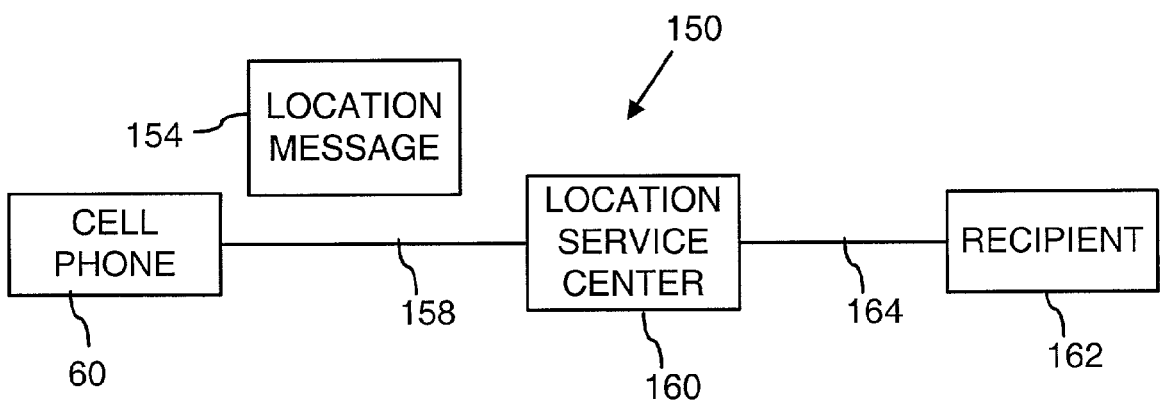

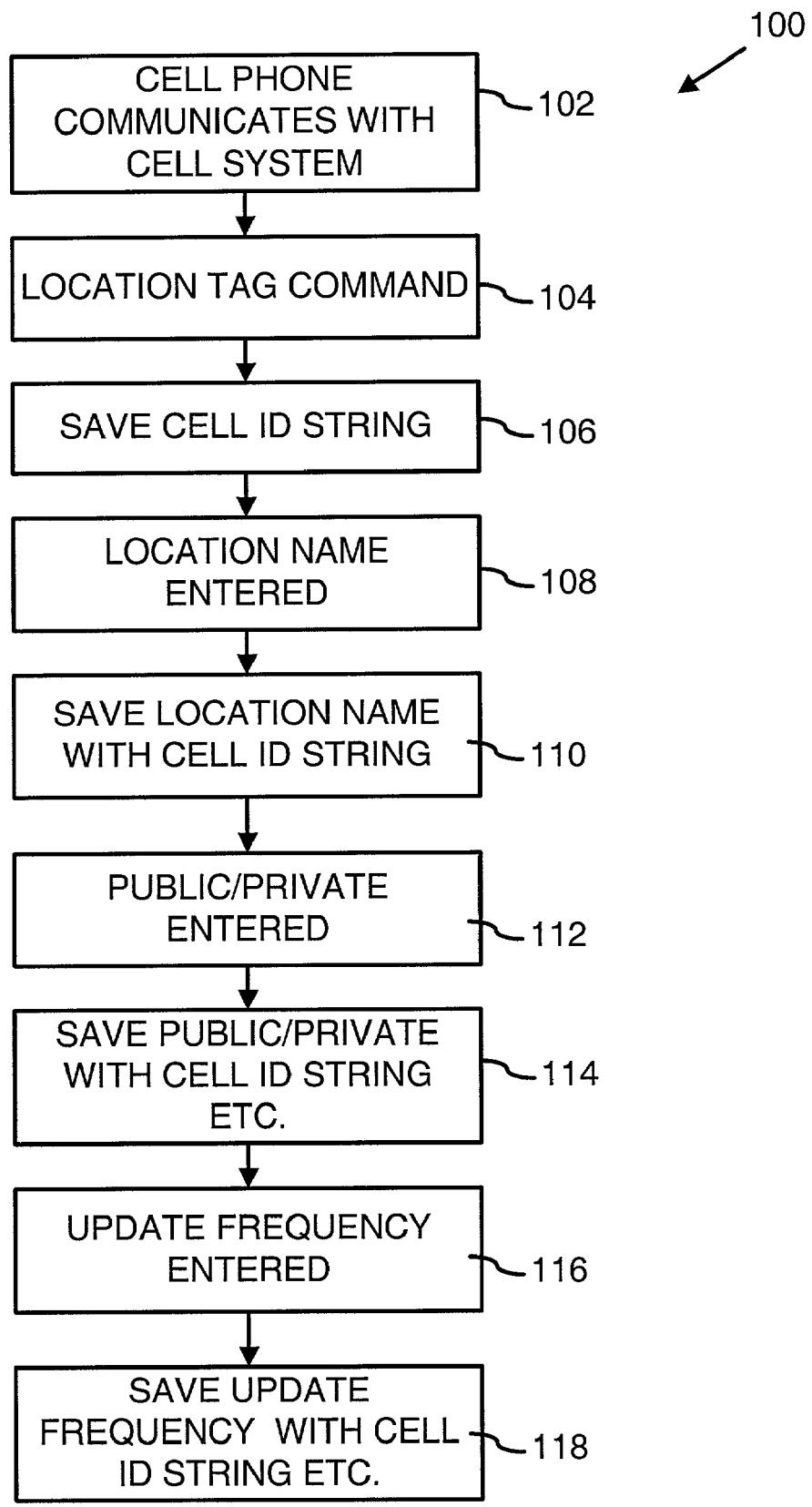

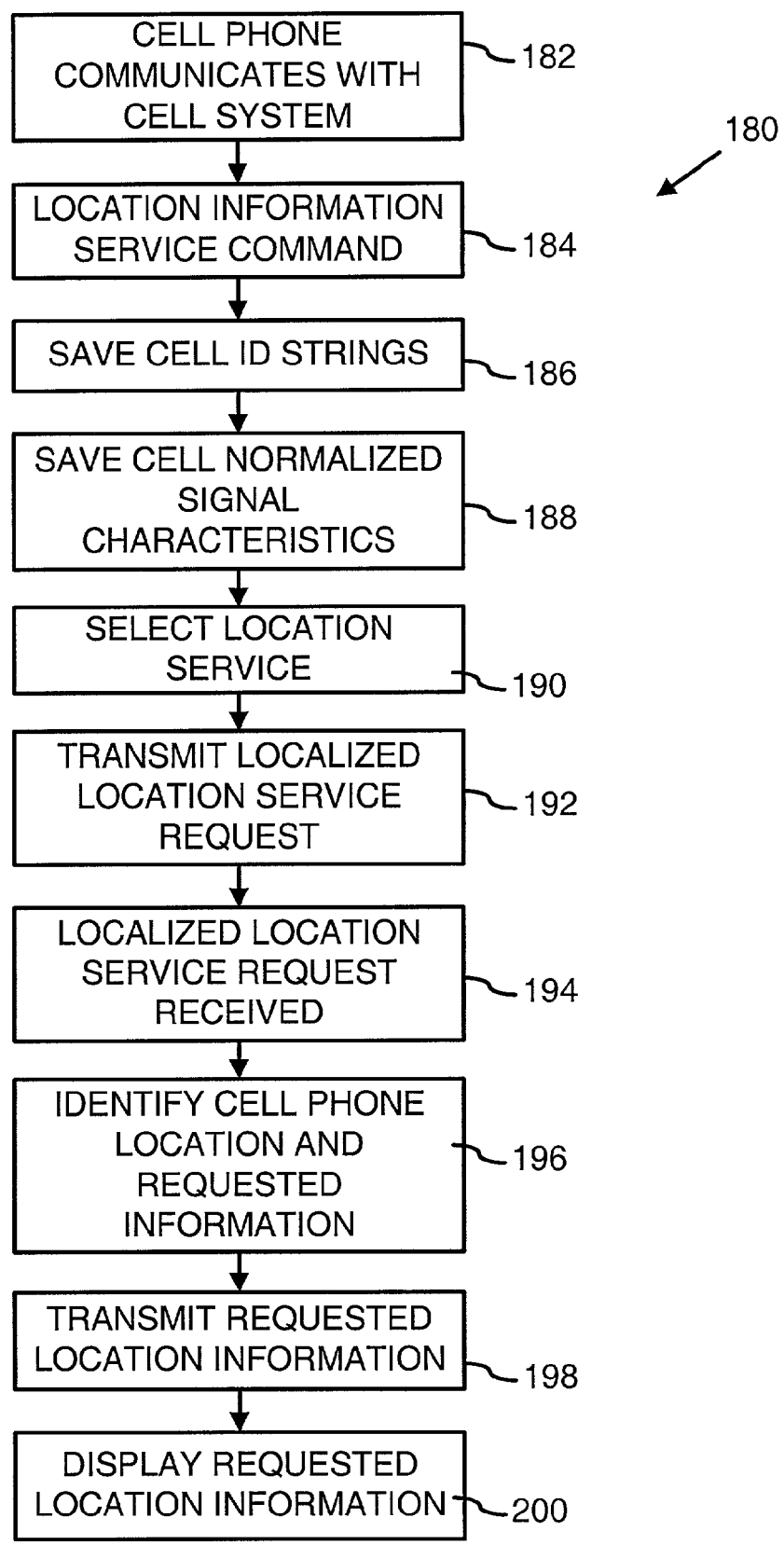

USER-TAGGING OF CELLULAR TELEPHONE LOCATIONS

SUMMARY OF THE INVENTION

The present invention relates to digital cellular telephones, and in particular to a cellular telephone location application and service that are controlled by a cellular telephone user.

The mobility of cellular telephones has provided a versatile, affordable, and convenient communication tool for large numbers of people. A mobile or wireless cellular telephone can be moved among communication cells of a cellular telephone network and maintain seamless communication with the network. Initially, cellular telephones were used solely for voice communications. As cellular telephones have improved and incorporated digital processing capabilities, such as in GSM-style digital cellular telephones, other communication capabilities have been added, such as text messaging of the type referred to as short message service (SMS) messaging that is commonly used in GSM cellular telephones.

An aspect of the present invention is the addition of a user-controlled cellular telephone positioning feature by which a cellular telephone user may correlate a user-specified location name with a cellular telephone location among one or more cells of a cellular telephone network. Such a user-controlled cellular telephone positioning feature maintains user privacy by maintaining location data on a user's cellular telephone. In contrast, cellular telephone network operators conventionally have been able to identify a cell within which a cellular telephone is located without a user's knowledge or permission. Such information has sometimes been used in law enforcement situations, but as a generally available resource would be viewed by many users as an undesirable invasion of privacy.

With location data maintained on a user's cellular telephone, the user can selectively make the location information available others. In one implementation, a cellular telephone location tagging application is stored and operated on a cellular telephone. The application obtains a cell identification string corresponding to a cell of a cellular telephone system with which cell the cellular telephone is in communication. The user associates a location name and the cell identification string as location information for a selected location. The user may also specify that the location information may be transmitted from the cellular telephone to a cellular telephone location service center that receives the location information and selectively forwards it to a predefined recipient (e.g., a telephonic or computer network service or user).

Additional objects and advantages of the present invention will be apparent from the detailed description of the preferred embodiment thereof, which proceeds with reference to the accompanying drawings.

BRIEF DESCRIPTION OF THE DRAWINGS

FIG. 3 is a block diagram illustrating operation of a user-controlled cellular telephone location tagging application as stored in a cellular telephone memory.

FIG. 4 is a flow diagram of a first implementation of a user-controlled cellular telephone location tagging method.

FIG. 6 is a block diagram illustrating operation of a user-controlled cellular telephone location posting system for posting or otherwise providing location information regarding a cellular telephone.

FIG. 7 is a flow diagram of a cellular telephone location information method by which a cellular telephone system operator can provide a location information service to a cellular telephone user.

DETAILED DESCRIPTION OF PREFERRED EMBODIMENTS

Figure 1:
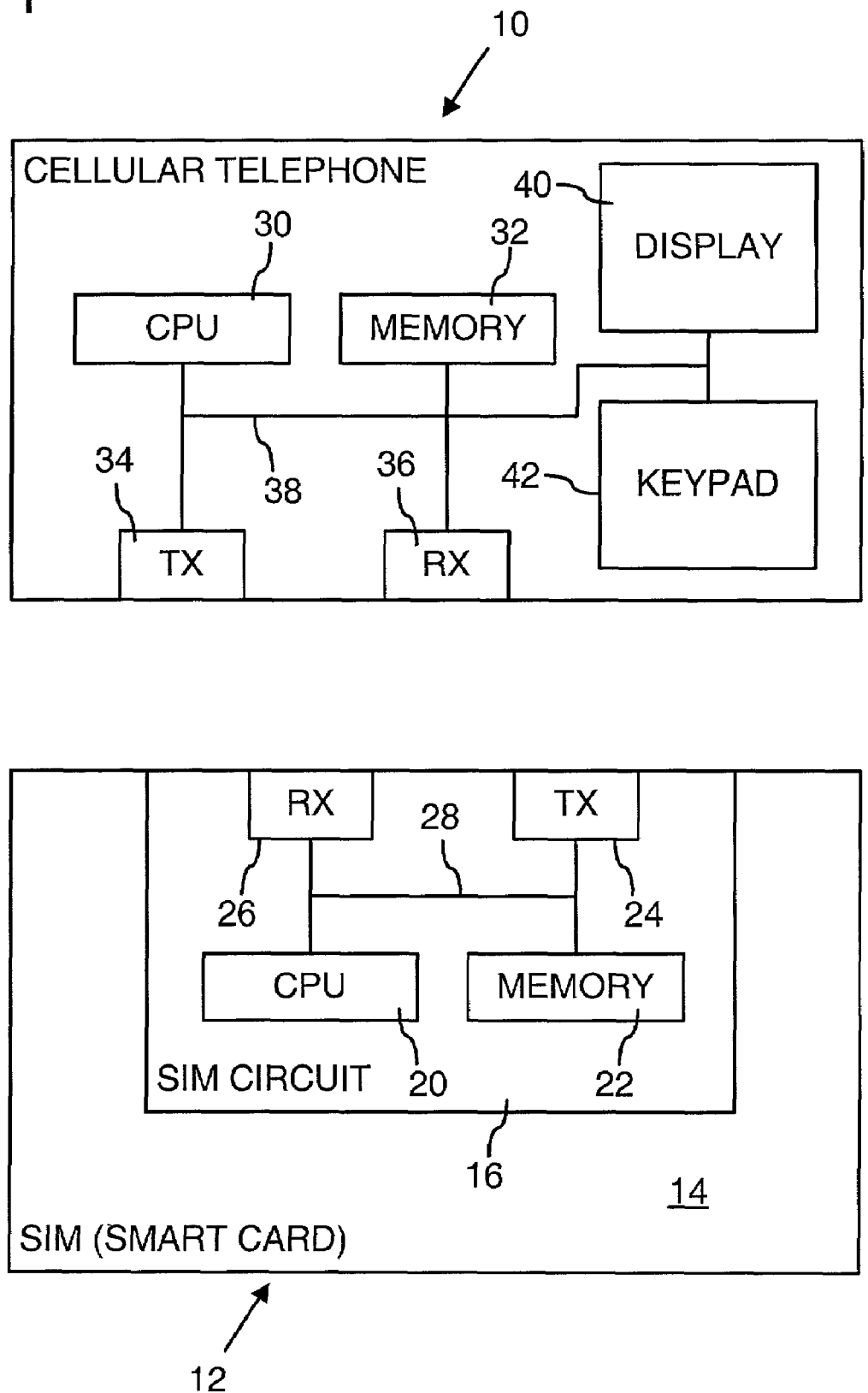
FIG. 1 illustrates a GSM cellular telephone as an exemplary cellular telephone operating environment for an embodiment of the present invention.

FIG. 1 illustrates a GSM cellular telephone 10 as an exemplary cellular telephone operating environment for an embodiment of the present invention. GSM cellular telephone 10 may conform, for example, to the European Telecommunications Standards Institute (ETSI) specifications GSM 11.11 and GSM 11.14 for Global Systems for Mobile communications. It will be appreciated, however, that GSM cellular telephone 10 could instead conform to another cellular telephone standard or a standard not yet developed, such as the ETSI 3rd Generation Mobile System standard that is sometimes referred to as the Third Generation Partnership Project or "3GPP".

GSM cellular telephone 10 includes a removable Subscriber Identity Module (SIM) 12, which is sometimes called a smart card or chip card. For example, SIM 12 can be of a smart card format that has the well-known size of credit cards (e.g., standardized dimensions of 53.98 mm×85.60 mm×0.76 mm), or can be of a smaller format that is sometimes called a "plug-in SIM". SIM 12 includes a medium 14 that supports a SIM electronic circuit 16 (e.g., one or more semiconductor integrated circuits or chips). Medium 14 typically includes multiple laminated synthetic layers, with one or more internal layers being between outer layers. SIM electronic circuit 16 is incorporated into or on at least one of the internal layers.

SIM electronic circuit 16 includes a central processing unit or CPU 20 (e.g., a microprocessor or microcontroller) in conjunction with a memory system 22, a data transmit interface 24, and a data receive interface 26, all of which are interconnected by a bus structure 28. Similarly, GSM cellular telephone 10 includes a central processing unit or CPU 30 (e.g., a microprocessor or microcontroller) in conjunction with a memory system 32, a data transmit interface 34, and a data receive interface 36, all of which are interconnected by a bus structure 38. In addition, GSM cellular telephone 10 includes a system display 40 and a user input device or keypad 42, as well as a power supply (e.g., a battery), telephonic audio input and output elements, and radio frequency transmitting and receiving elements that are not shown.

While SIM electronic circuit 16 includes the basic elements of a simple computer, neither SIM 12 nor SIM electronic circuit 16 is capable of functioning as a stand-alone computer. Neither SIM 12 nor SIM electronic circuit 16 includes a power source or user interface components by which a user could interact with SIM 12 or SIM electronic circuit 16. The computer functionality of SIM 12 can be accessed only by connecting it to another computer, such as GSM cellular telephone 10 or a SIM reader that is connected to a personal computer, as is known in the art. When connected to another computer, such as GSM cellular telephone 10, SIM 12 is powered and communicates through its interfaces 24 and 26 to receive data from and provide data to the other computer.

As is common, GSM cellular telephone 10 supports a fixed length text message service by which radiated (i.e., wireless) fixed length text messages of up to a maximum fixed length may be transmitted or received by GSM cellular telephone 10. As an example, the fixed length text message service could include or conform to the short message service (SMS) standard that is part of the GSM Phase 1 standard. The SMS standard allows transmission of radiated fixed length text messages of up to about 160 characters in length. Such a fixed length text message service conforms to memory constraints and arrangements in GSM cellular telephone 10 and so may be distinguished from conventional network connections or services in which files of generally arbitrary size may be transmitted.

Figure 2:
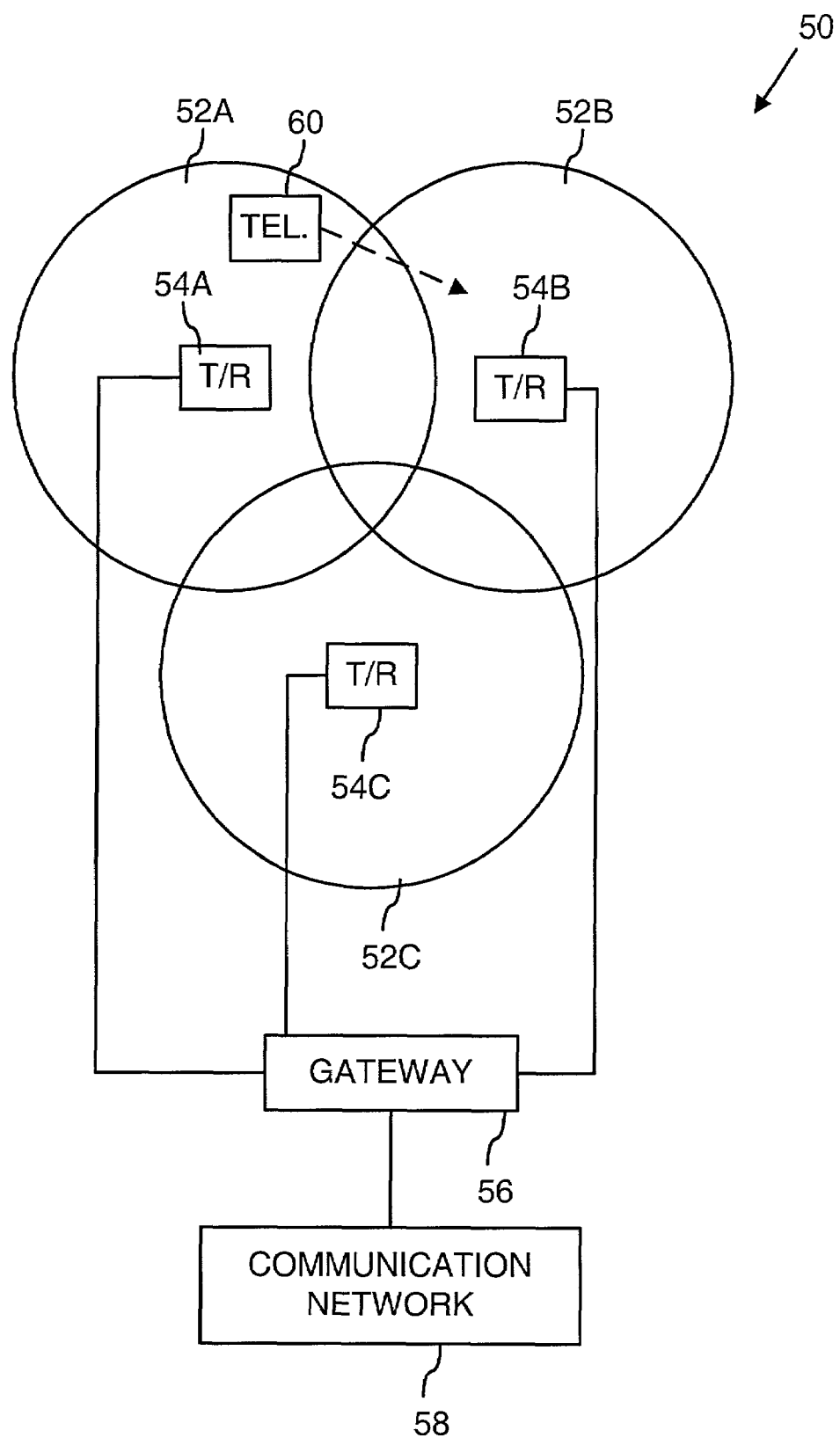
FIG. 2 is a schematic diagram of a conventional cellular telephone system having multiple communication cells

FIG. 2 is a schematic diagram of a conventional cellular telephone system 50 having multiple communication cells 52A, 52B, 52C, etc. Each of communication cells 52A, 52B, and 52C corresponds to at least one wireless or radiating transceiver station 54A, 54B, and 54C, respectively. Transceiver stations 54A, 54B, and 54C communicate with one or more communication gateways 56 (only one shown), which are in communication with a communication network 58 such as a public switched telephone network.

A mobile or wireless cellular telephone 60, which is an exemplary one of typically many cellular telephones (not shown), can be moved among communication cells 52A, 52B, and 52C and maintain seamless communication with communication network 58. Cellular telephone 60 may be of the GSM-type, with the characteristics of GSM cellular telephone 10, or may be based upon any other cellular telephone format or standard.

As is known in the art, cellular telephone 60 within a cell (e.g., 52A) communicates with communication network 58 by establishing a wireless or radiating link with the corresponding transceiver station (e.g., 54A). The communication between cellular telephone 60 and communication network 58 is maintained as cellular telephone 60 passes between cells (e.g., cell 54A to cell 54B) when the link from cellular telephone 60 is passed between the corresponding transceiver stations (e.g., station 54A to station 54B). For example, the link from cellular telephone 60 may be passed between transceiver stations (e.g., station 54A to station 54B) when cellular telephone detects that the radiated signal power from one transceiver station (e.g., station 54B) exceeds the radiated signal power from another transceiver station (e.g., station 54A).

The transceiver station 54 with which cellular telephone 60 is linked at any time is identified within cellular telephone 60 by a cell identification data string. Since cells 52 typically cover overlapping areas to maintain seamless communication as it is moved between them, cellular telephone 60 utilizes the cell identification data string to specify the station 54 with which cellular telephone 60 is linked. Cellular telephone 60 may simultaneously be within range of multiple cells 52 and may have stored in it a cell identification data string for each cell.

FIG. 3 is a block diagram illustrating operation of a user-controlled cellular telephone location tagging application 80 stored in a memory of cellular telephone 60. As described above, the memory of cellular telephone 60 also includes in a cell identification memory space 82 a cell identification string 84 corresponding to each of the one or more cells 52 (only one shown) with which cellular telephone 60 is in communication. As is known in the art, cell identification string 84 is utilized by cellular telephone 60 to identify a particular one of cells 52 through which communications are to be transmitted.

In one implementation, location tagging application 80 allows or prompts a user to tag a current location of cellular telephone 60, such as by making a predefined entry on the cellular telephone keypad (e.g., keypad 42) or selection of an interface option rendered on the cellular telephone display (e.g., display 40). Upon tagging of a current location, location tagging application 80 copies the at least one cell identification string 84 in cell identification memory space 82 to a tagged location data file 86.

Location tagging application 80 also allows or prompts the user to enter a location name 88 for the current location, such as by entering the name with the cellular telephone keypad (e.g., keypad 42). For example, location name 88 could be "home," "work," "friend's house," etc. Location name 88 is associated with the corresponding cell identification string 84 in tagged location data file 86. Together, location name 88 and cell identification string 84 form in location data file 86 a data structure for user-controlled cellular telephone location data. For example, location data file 86 could be implemented as a look-up table that correlates a cell identification string 84 with a location name 88. It will be appreciated that location data file 86 would typically include user-controlled cellular telephone location data for multiple locations.

An aspect of location tagging application 80 is that it maintains user privacy by maintaining location data on a user's cellular telephone. Conventionally, cellular telephone system operators have been able to identify a cell 52 within which a cellular telephone 60 is located. Such information has sometimes been used in law enforcement situations, but as a generally available resource would be viewed by many users as an invasion of privacy. With location data maintained on a user's cellular telephone, the user can selectively make the location information available to others.

For example, location tagging application 80 may allow or prompt the user to enter a public/private indication 90 that establishes whether location data on the user's cellular telephone is to be made available to others, such as by transmitting the location data from the cellular telephone to cellular telephone system 50. The location data (e.g., location name 88 only) would be transmitted only if a public state were indicated. In one implementation, the location data may be transmitted to cellular telephone system 50 in a standard text message format, such as a SMS message format.

If public/private state indication 90 is public to indicate that the location data is to be made available to others, location tagging application 80 may also allow or prompt the user to enter a frequency indication 92 to establish a frequency at which the location data on the user's cellular telephone is to be made available to others. In one implementation, the location information is made available to others according to a list (e.g., other cell phones or computers) that is created by the user and identifies who (i.e., what device) is to receive updated location data.

The location data would be transmitted at a frequency that could be indicated as a time period between each transmission or "update" (e.g., 60, 30, 15 minutes). For example, one time period could be a default frequency that is used by location tagging application 80 in the absence of another frequency specified by the user. In one implementation, a location information update is triggered when the cellular telephone is switched on and upon a change of the main cell that the cellular telephone is using. The cellular telephone sends the update to registered or identified "users" (e.g., other cellular telephones or computers) by sending SMS messages to each one. In an implementation that reduces messaging costs, the cellular telephone sends the location update to one server that in turn broadcasts the information to the same registered "users."

In accordance with the present invention, FIG. 4 is a flow diagram of a user-controlled cellular telephone location tagging method 100 by which a cellular telephone user may register a cellular telephone location on a cellular telephone, the location corresponding to the position of a cellular telephone 60 in a region encompassed by one or more cells 52 of a cellular telephone system 50. User-controlled cellular telephone location tagging method 100 may be executed by a location tagging application (i.e., software instructions) stored on the cellular telephone 60. In an implementation in which cellular telephone 60 is a GSM cellular telephone 10, the location tagging application may be stored on GSM cellular telephone 10 or SIM electronic circuit 16 of SIM 12.

Process block 102 indicates that a cellular telephone is in communication with at least one cell of a cellular telephone system.

Process block 104 indicates that a user enters a location tag command on the cellular telephone. For example, with a location tagging application running on the cellular telephone, the user may actuate a selection of a location tag command with reference to a command prompt displayed on the cellular telephone.

Process block 106 indicates that a cell identification string of a cell with which the cellular telephone is communicating is saved on the cellular telephone as a tagged location cell identification string.

Process block 108 indicates that the user enters a location name on the cellular telephone, such as in response to a prompt from the cellular telephone.

Process block 110 indicates that the location name is saved in association with the tagged location cell identification string. For example, the location name and tagged location cell identification string may be stored in a look-up table that correlates location names with corresponding tagged location cell identification strings.

Process block 112 indicates that the user enters on the cellular telephone a public/private indication of whether the location is to be made publicly available to others. This entry can be made in response to a prompt from the cellular telephone.

Process block 114 indicates that the public/private indication is saved in association with the tagged location cell identification string and the location name.

If the location is indicated to be publicly available, process block 116 indicates that the user enters a location update frequency representing the frequency at which the location, or all publicly available locations, are to be made available to others. This entry can be made in response to a prompt from the cellular telephone.

Process block 118 indicates that the location update frequency is saved in association with the other location data.

Typically, each cell 52 in a cellular telephone system 50 will encompass an area of several square miles. If only one cell identification string of only one cell 52 is associated with each location name, a user could unambiguously identify only one location for each cell 52. While such a coarse location resolution could be suitable for many users, some users might wish to specify more than one location within the region encompassed by a particular cell 52.

Figure 5:
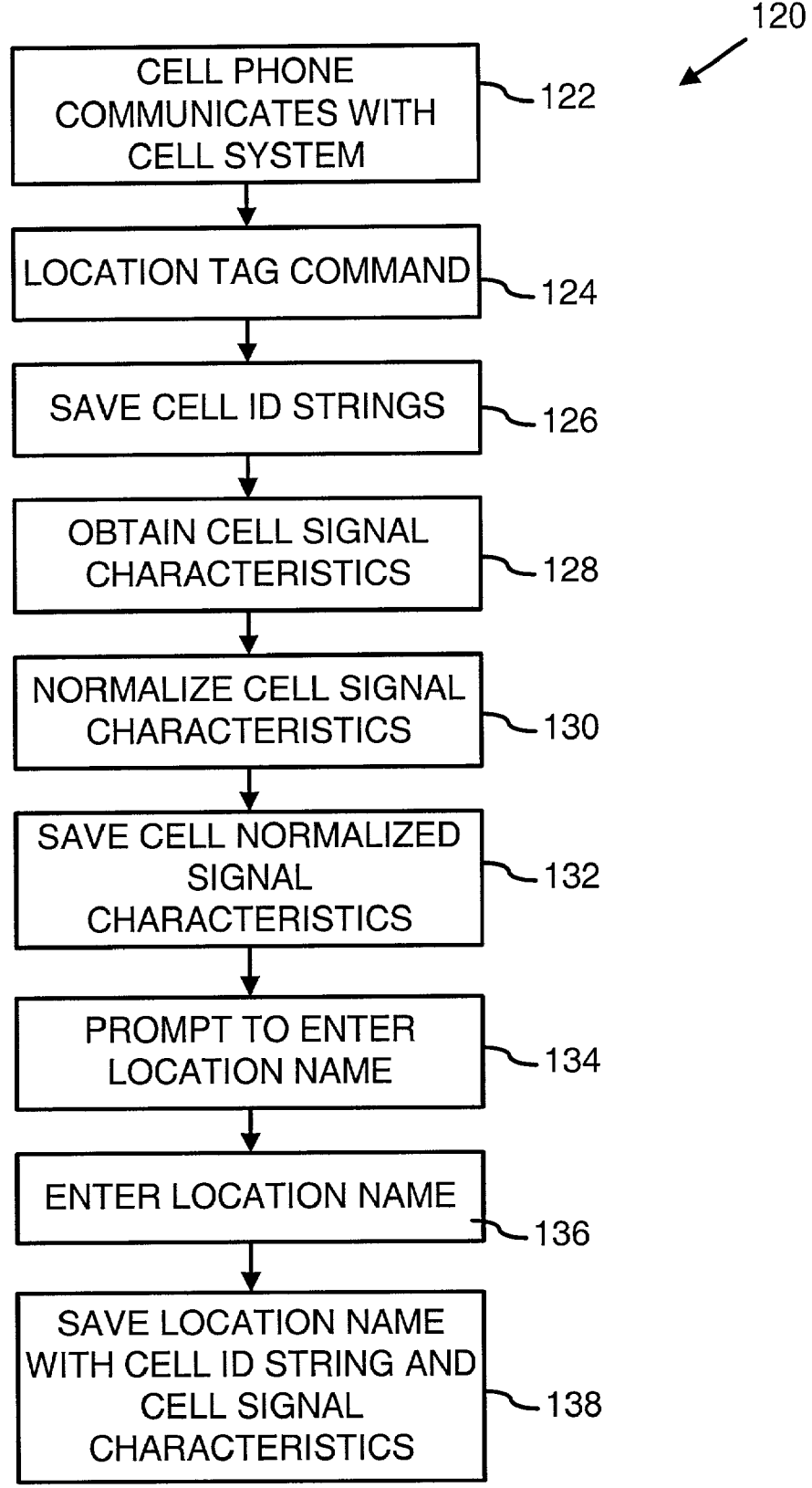
FIG. 5 is a flow diagram of a second implementation of a user-controlled cellular telephone location tagging method.

FIG. 5 is a flow diagram of another implementation of a user-controlled cellular telephone location tagging method 120 by which a cellular telephone user may register a cellular telephone location on a cellular telephone.

Process block 122 indicates that a cellular telephone is in communication with at least one cell of a cellular telephone system.

Process block 124 indicates that a user enters a location tag command on the cellular telephone.

Process block 126 indicates that each cell identification string for each cell with which the cellular telephone is communicating is saved on the cellular telephone as one or more tagged location cell identification strings.

Process block 128 indicates that a cell signal characteristic (e.g., power) indication for each cell with which the cellular telephone is communicating is obtained on the cellular telephone for each of the tagged location cell identification strings. Cell signal power indications could correspond to the radiated signal transmission power for each cell as determined by the cellular telephone.

Process block 130 indicates that the cell signal power indications are normalized with respect to a normalization factor to form normalized cell signal power indications. The multiple cell signal power indications provide multiple power indications that can identify many locations with a much higher resolution than can a single cell. Normalization of the power indications is an optional step which maintains the improved location correlation even when transmission power received by the cellular telephone varies for all cells, such as when the cellular telephone is in or out of a building or automobile.

Process block 132 indicates that the normalized cell signal power indications are saved on the cellular telephone as a tagged location cell identification string.

Process block 134 indicates that the user is prompted to enter a location name on the cellular telephone.

Process block 136 indicates that that the user enters the location name.

Process block 138 indicates that the location name is saved in association with the tagged location cell identification string and the cell signal characteristics.

FIG. 6 is a block diagram illustrating operation of a user-controlled cellular telephone location posting system 150 for posting or otherwise providing location information regarding a cellular telephone 60 in a cellular telephone system 50. For purposes of simplicity, this illustration is directed to providing location information in only direction: from cellular telephone 60 to location posting system 150. It will be appreciated that cellular telephone 60 and location posting system 150 could be capable of bidirectional communication so that the following description would be similarly applicable to communication from location posting system 150 to cellular telephone 60.

A user-specific location message 154 created at cellular telephone 60 is transmitted over a communication channel 158 to a cellular telephone location service center 160 that functions as a store and forward center for transmitting location information. In one implementation, cellular telephone location service center 160 may be associated with or included in a short message service center that processes SMS-format text messages available with many GSM cellular telephones, or may be transmitted over another communication channel or in another communication format.

For example, location service center 160 receives an encrypted text location message 154 from cellular telephone 60 and stores location message 154 until it is to be forwarded to a recipient 162. Location message 154 includes a cellular telephone user identity (e.g., a cellular telephone number, sometimes referred to herein as a telephonic address) and a location indicator (e.g., a location name). The cellular telephone user identity may be associated at location service center 160 with other registered identities of the user (e.g., instant messaging identities, network user identities, etc.). Recipient 162 may be or include any telephonic, cellular telephonic, or computer network (e.g., Internet) based user or service, including instant messaging services (MSN, Yahoo, AOL, etc.) or users, email services or users, cellular telephone users, etc., or any other computer-based program that can register the state string sent by the phone, correlate the information with a user identity, store it and display it on the web or within any computer application to be queried. In the context of an instant messaging system, for example, the location information can appear in addition to the status information currently used (e.g., typing, away, busy, logged off).

Location service center 160 transmits location information from location message 154 to recipient 162 over a communication channel 164. Location service center 160 may transmit the location information in response to a query from a recipient 162 or may automatically broadcast the location information to specified recipients 162. Location service center 160 can actively send status and location status updates to specified services in specified formats and therefore publish the information regarding the cellular user status and location status. Communication channels 158 and 164 may be or include any public or private computer network (e.g., the global computer network called the Internet) or any telephone network (e.g., any PSTN or any cellular or other wireless communication network).

In the descriptions above, location information is obtained and managed by a cellular telephone user independently of a cellular telephone system operator. It will be appreciated, however, that in other implementations the cell identification data string or strings included in the location information could be transmitted from a user cellular telephone to a cellular telephone system operator as part of a location information service.

FIG. 7 is a flow diagram of a cellular telephone location information method 180 by which a cellular telephone system operator can provide a location information service to a cellular telephone user.

Process block 182 indicates that a cellular telephone is in communication with at least one cell of a cellular telephone system.

Process block 184 indicates that a user enters a location information service command on the cellular telephone.

Process block 186 indicates that each cell identification string for each cell with which the cellular telephone is communicating is saved on the cellular telephone as one or more tagged location cell identification strings.

Process block 188 indicates that normalized cell signal power indications are saved on the cellular telephone with the tagged location cell identification strings.

Process block 190 indicates that the user indicates on the cellular telephone a location service command for selecting a location service, such as from the cellular telephone system operator or another service provider. For example, an "I am lost" service command could function as a request for a description or name of a current location of the cellular telephone. An "I need instructions to get to my destination" service could function as a request for directions from a current location of the cellular telephone to a destination location entered by the user. An "Assisted tagging" service could assist a user with tagging or naming a location being tagged by the user by providing a suggested name or description, thereby freeing the user from manually entering it.

Process block 192 indicates that the normalized cell signal power indications, together with an indication of the location service being requested, are transmitted as a localized location service request from the cellular telephone to the cellular telephone system operator or another service provider.

Process block 194 indicates that the localized location service request is received by the cellular telephone system operator or another service provider.

Process block 196 indicates that the location of the cellular telephone user is identified from the normalized cell signal power indications and the information corresponding to that cellular telephone location and the requested location service is determined. For example, in an "I am lost" service request, the location service information could be a description or name of a current location of the cellular telephone (e.g., street intersection). In an "I need instructions to get to my destination" service request, the location service information could be text directions from a current location of the cellular telephone to the destination location entered by the user. In an "Assisted tagging" service, the location service information could be a suggested name or description of the current location, thereby freeing the user from manually entering it.

Process block 198 indicates that the requested location service information is transmitted to the cellular telephone.

Process block 200 indicates that the requested location service information is displayed on the cellular telephone.

Location information method 180 is described with reference to an implementation in which information is provided back to a cellular telephone user. It will be appreciated that in other implementations, the information service could provide the information to a recipient other than the cellular telephone user.

For example, the cellular telephone system operator or another service provider could periodically translate the cellular telephone location information into a location name or description that could be forwarded to a different recipient, such as a dispatcher for the cellular telephone user. As one example, a delivery vehicle could be tracked by a delivery dispatcher. Such a system could be an inexpensive substitute for a satellite-based tracking system, as is used by some delivery companies.

As another example, the cellular telephone system operator or another service provider could translate the cellular telephone location information into a location name or description that could be forwarded to a different recipient only upon a singular event, such as a request for a particular service (e.g., a taxi service). Such a system could allow a taxi dispatcher to send the nearest available taxi based on location status. The same feature could be applied to a call to an emergency (e.g., 911) service.

In accordance with the practices of persons skilled in the art of computer programming, the present invention is described above with reference to acts and symbolic representations of operations that are performed by various computer systems, including mobile communication devices and "smart cards." Such acts and operations are sometimes referred to as being computer-executed and may be associated with the operating system or the application program as appropriate. It will be appreciated that the acts and symbolically represented operations include the manipulation by a CPU of electrical signals representing data bits, which causes a resulting transformation or reduction of the electrical signal representation, and the maintenance of data bits at memory locations in a memory system to thereby reconfigure or otherwise alter the computer system operation, as well as other processing of signals. The memory locations where data bits are maintained are physical locations that have particular electrical, magnetic, or optical properties corresponding to the data bits.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

The invention claimed is:

1. In a computer readable medium of a cellular telephone, a cellular telephone location tagging application comprising computer-executable instructions that, when executed on a computer, perform the following steps:
   obtaining location information data corresponding to a plurality of locations of the cellular telephone in a cell of a cellular telephone system, wherein the location information data for each of the plurality of locations includes plural cell identification strings corresponding to plural cells of a cellular telephone system with which the cellular telephone is in communication and in which the plural cell identification strings are associated with each location within the cell;
   associating on the cellular telephone a location name with the location information data corresponding to each of the plurality of locations; and
   selectively providing the location information data to one or more users over a communication channel.

2. The medium of claim 1 further comprising instructions to perform a step of separately establishing a user-specified location status indication with the location information data.

3. The medium of claim 1 further comprising instructions to perform a step of receiving an identity of a user-specified recipient of the location information.

4. The medium of claim 3 in which the user-specified recipient is a telephonic or computer network address associated with a particular user.

5. The medium of claim 3 in which the user-specified recipient is a computer network service or telephonic service.

6. The medium of claim 1 further comprising instructions for performing steps of:
   obtaining on the cellular telephone a cell signal characteristic that characterizes a cellular transmission signal for each of the plural cells with which the cellular telephone is in communication; and
   associating on the cellular telephone the cell signal characteristic with the location name and each corresponding cell identification string.

7. The medium of claim 6 in which the cell signal characteristic includes signal strength.

8. The medium of claim 1 further comprising instructions for performing a step of establishing a computer network instant messaging service as a recipient of the location information data.

9. The medium of claim 1, wherein the associating step further comprises receiving the location name from a user.

10. A method for use in a cellular telephone, comprising:
    establishing communication with a cellular telephone system;
    obtaining location information data corresponding to a plurality of locations of the cellular telephone in a cell of a cellular telephone system, wherein the location information data for each of the plurality of locations includes plural cell identifications strings corresponding to plural cells of a cellular telephone system with which the cellular telephone is in communication and in which the plural cell identification strings are associated with each location within the cell;
    associating a location name with the location information data corresponding to each of the plurality of locations; and
    selectively transmitting the location information data from the cellular telephone.

11. The method of claim 10 further comprising obtaining and storing on the cellular telephone a user-specified recipient of the location information.

12. The method of claim 11 in which the user-specified recipient is a telephonic or computer network address associated with a person.

13. The method of claim 11 in which the user-specified recipient is a computer network or telephonic service.

14. The method of claim 10 further comprising:
    obtaining on the cellular telephone a cell signal characteristic that characterizes a cellular transmission signal for each of the plural cells with which the cellular telephone is in communication; and
    associating on the cellular telephone the cell signal characteristic with the location name and each corresponding cell identification string.

15. The method of claim 14 in which the cell signal characteristic includes signal strength.

16. The method of claim 10 further comprising establishing a computer network instant messaging service as a recipient of the location information.

17. The method of claim 10, further comprising obtaining the location name from a user of the cellular telephone.

18. A computer readable medium on a cellular telephone having computer executable instructions stored thereon that, when executed, perform steps comprising:
    (a) obtaining location information data corresponding to a plurality of locations of the cellular telephone in a cell of a cellular telephone system, wherein the location information data for each of the plurality of location includes plural cell identification strings corresponding to plural cells of a cellular telephone system with which the cellular telephone is in communication and in which the plural cell identification strings are associated with each location within the cell;
    (b) associating on the cellular telephone the location service request and the plural cell identification strings as a localized location service request; and
    (c) transmitting the localized location service request to a cellular telephone location information service provider.

19. The medium of claim 18, further comprising obtaining a cellular transmission signal for each of the plural cells with which the cellular telephone is in communication; and
    associating on the cellular telephone the cell signal characteristic with the location service request and each corresponding cell identification string.

20. A method comprising:
    (a) receiving at a service center, location information from a cellular telephone, the location information corresponding to a plurality of locations of the cellular telephone in a cell of a cellular telephone system, wherein the location information data for each of the plurality of locations includes plural cell identification strings corresponding to plural cells of a cellular telephone system with which the cellular telephone is in communication and in which the plural cell identification strings are associated with each location within the cell;
    (b) selectively forwarding the location information to a recipient identified by the cellular telephone.

21. The method of claim 20 further comprising receiving from the cellular telephone, a location status indication, and in which selectively forwarding includes selectively forwarding the location information based upon the location status indication.

22. The method of claim 20 further comprising associating the location information with one or more network identities of a user of the cellular telephone.

23. The method of claim 20 in which selectively forwarding includes selectively forwarding the location information to the recipient at a computer network address.

24. The method of claim 20 in which selectively forwarding includes selectively forwarding the location information to the recipient at a telephonic address.

* * * * *

UNITED STATES PATENT AND TRADEMARK OFFICE
CERTIFICATE OF CORRECTION

| | |
|---|---|
| PATENT NO. | : 7,444,156 B2 |
| APPLICATION NO. | : 09/789434 |
| DATED | : October 28, 2008 |
| INVENTOR(S) | : Jerome Boss et al. |

It is certified that error appears in the above-identified patent and that said Letters Patent is hereby corrected as shown below:

In column 9, line 65, in Claim 10, delete "identifications" and insert -- identification --, therefor.

In column 10, line 38, in Claim 18, delete "location" and insert -- locations --, therefor.

Signed and Sealed this
Twenty-sixth Day of April, 2011

David J. Kappos
*Director of the United States Patent and Trademark Office*